3,632,658
LITHIATED ORGANIC COMPOUNDS AND THEIR PRODUCTION
Adel F. Halasa, Akron, Ohio, assignor to The Firestone Tire & Rubber Company, Akron, Ohio
No Drawing. Continuation-in-part of application Ser. No. 685,339, Nov. 24, 1967. This application Aug. 16, 1968, Ser. No. 753,061
Int. Cl. C07l 1/02, 1/04, 7/08
U.S. Cl. 260—665     14 Claims

ABSTRACT OF THE DISCLOSURE

Aromatic hydrocarbons (benzene, naphthalene, anthracene, indene, fluorene, biphenyl, etc.) are metalated with an alkali metal compound (preferably hydrocarbon lithium) in the presence of a promoter (preferably N,N,N′,N′-tetra-methylethylenediamine or an alkali metal alkoxide) at an elevated temperature. Aromatic compounds metalated with alkali metals and containing at least two alkali metal atoms are new.

---

This application is a continuation-in-part of my application Ser. No. 685,339 filed Nov. 24, 1967, now abandoned.

The lithiation of aromatic hydrocarbons is known. See, for instance, Organic Reactions, vol. 8, pages 258–304 published in 1954 by John Wiley and Sons, Inc., New York, New York, Chapter 6, Metalation Reaction With Organolithium Compounds by Henry Gilman and John W. Morton, Jr. The use of diamines as promoters in the production of monolithiated compounds of aromatic hydrocarbons has been recently published by G. G. Eberhardt and W. A. Butte, J. Org. Chem. 4, 1965 (483); A. W. Langer, Jr., Trans., New York Academy Science 27, 1965, page 741; C. G. Screttas and J. F. Eastham, J. Amer. Chem. Soc. 87 (1965), 3276; M. D. Rausch and D J. Ciappenelli, J. Organometal Chem., 10 (1967) 127–136. In all of these publications no dimetalation of a benzenoid has been observed. In fact, Rausch et al. reported in the above reference that several attempts to effect dimetalation of benzene resulted in only mono-metalation. It is quite clear that previous workers in this area isolated only mono-metalated compounds.

According to the processes of the above citations, only one lithium atom is united with each aromatic nucleus. In application Ser. No. 663,512, of Malasa and Tate, it is disclosed that by treating ferrocenes, metallocene hydrocarbon non-benzenoid compounds, at 70° C. with butyllithium and a diamine as a promoter, a product containing as high as 7 lithium atoms on the ferrocene moiety was obtained. Application Ser. No. 606,011 filed Dec. 30, 1966 describes the poly-lithiation of unsaturated polymers by the use of an organolithium compound and a promoter.

It has now been found that if a promoter agent is present during the lithiation or other alkali metal metalation of a benzenoid or equivalent hydrocarbon such as azulene, the reaction proceeds more rapidly than in their absence, and a higher metalation level is possible. The compounds which may be nuclearly multi-metalated include, for example, benzene, naphthalene, anthracene, indene, fluorene, biphenyl, phenanthrene, triphenylmethane, di- and tri-naphthalene alkanes, quinoline and alkyl and aryl derivatives thereof such as toluene, etc. There may be as many as three alkyl groups on such benzenoid nuclei, each containing one to four carbon atoms. None of foregoing metalates with n-butyllithium as does ferrocene.

The metalated compounds can be reacted with a halosilane to produce corresponding aromatic silanes and with deuterium oxide (heavy water) to produce the corresponding deuterated compounds which on analysis demonstrate the number of metal atoms on the compounds which are replaced in such treatment. The metalated compounds may be reacted with other reactants to replace one or more of the metal atoms with a silyl, carboxyl, hydroxyl, amino, halogen, alkyl, aryl, allyl, benzyl, benzoyl, benzhydryl, hydroxymethyl, beta-hydroxyethyl, substituted hydroxymethyl, styryl, butadienyl, isoprenyl or an alpha-olefin group, or different metal atoms on the same compound may be replaced by different such groups. When an alkyllithium is used as the promoter, alkylation will occur at least to a degree. The carboxylated compounds and their sodium and other salts are valuable plastics, and may be used as intermediates in the preparation of other plastics.

The bifunctional diamines which may be used as promoters include:

(a) Aromatic and aliphatic tertiary diamines, and preferably those of the formula $R_1R_2N—C_xH_{2x}—NR_3R_4$ where each R may be a straight or branched-chain alkyl group of any chain length up to 10 to 20 or more carbon atoms all of which are included herein, and $x$ may be any whole number from 2 to 10 or more; and particularly the phenylene and ethylene diamines in which all alkyl substituents are the same. These include, for example, Tetramethyl-o-phenylenediamine
Tetramethyl-p-phenylenediamine
Tetramethyl-m-phenylenediamine
Tetramethylethylenediamine
Tetraethylethylenediamine
Tetradecylethylenediamine
Tetra- (mixed alkyl)ethylenediamines and corresponding methylene, propylene, etc. diamines.

(b) Cyclic diamines are included such as, for example:

The tetraalkyl 1,2-diamino cyclohexanes
The tetraalkyl 1,4-diamino cyclohexanes
Piperazine
N,N′-dimethylpiperazine (c) Bridgehead amines, such as, for example:

Sparteine
Triethylenediamine

The alkoxides and hydroxides which may be used as promoters include the following:

Sodium alkoxides of 1 to 4 or more carbon atoms
Potassium alkoxides of 1 to 4 or more carbon atoms
Cesium alkoxides of 1 to 4 or more carbon atoms
Rubidium alkoxides of 1 to 4 or more carbon atoms
Sodium hydroxide
Potassium hydroxide
Cesium hydroxide
Rubidium hydroxide
Sodium oxide
Potassium oxide
Cesium oxide
Rubidium oxide Alkali metal salts of aliphatic and aromatic thiols which may be used as promoters include, for example the sodium and potassium salts of:

Methyl thiol
Ethyl thiol
n-Propyl thiol
n-Butyl thiol
Thiophenol
Thionaphthol
Thioanthracene, and thiosalts of other alkali metals.

Alkali metal monoamides and diamides which may be used as promoters include, for example:

Sodium salt of dimethylamide
Sodium salt of di-n-butylamide
Sodium salt of cyclohexylamide
Sodium amide
Sodium N-acetamide
Sodium N,N'-dimethylethylamine, and the corresponding compounds of the other alkali metals.

The metalation reaction is apparently effected by means of a complex formed by the combination of (1) any one or more of the alkali metal compounds used for the metalation with (2) one or more of the promoters. Assuming that M and M' stand for any alkali metals, and R and R' stand for alkyl radicals of 1 to 20 carbon atoms (or hydrogen in a monoamide), which alkali metals and alkyl radicals may be the same or different, if RM = a hydrocarbon alkali metal
R'OM' = an alkoxide of an alkali metal
R'SM' = a thiosalt of an alkali metal
R'NM' and (R')$_2$NM' = mono and diamides in which the R' radicals are the same or different, and
y = an oxygen, sulfur or nitrogen atom
x = 1 to 3 the equation for production of the metalating reagent would be $$RM + R'yM' = (RR'yM)_xM'$$

The promoter and RM may be added separately or they may be pre-mixed or pre-reacted prior to addition to the polymer solution.

Representative compounds of the formula RM include, for example:

methyllithium
i-propyllithium
n-butyllithium
t-butyllithium
n-dodecyllithium
phenyllithium
alpha- and beta-naphthyllithiums
any biphenyllithium
styryllithium
benzyllithium
indanyllithium
1-lithio-3-butene
1-lithio-cyclohexene-3
1-lithio-cyclohexene-2
1,4-dilithiobutane
1,4-dilithiobenzene
1,3,5-trilithiopentane
1,3,5-trilithiobenzene
and the corresponding compounds of the other alkali metals.

Alkali metal compounds such as n-butyllithium metalate aromatic compounds with great difficulty. However, in the presence of a promoter they metalate with great ease and under mild conditions.

The reaction is usually carried out at a temperature in the range of 50–70° C. but may be carried out at higher and lower temperatures such as temperatures as low as 30° C. or as high as 150° C. or higher. Usually atmospheric pressure will be employed, but pressures higher and lower may be used if there is any advantage in doing so. Hydrocarbon non-aromatic solvents may be used, such as hexane, heptane, octane, dodecane, cyclohexane and higher boiling fractions of non-aromatic petroleum oils containing essentially high-boiling aliphatic hydrocarbons.

The invention is illustrated by the following examples. In the examples, N,N,N',N'-tetramethylethylenediamine is referred to by the letters TMEDA. Other hydrocarbon alkali metals than n-butyllithium may be used.

METALATION OF NAPHTHALENE

Into an appropriate vessel 0.10 mole of naphthalene (13 grams) and 350 ml. of butyllithium and 23.6 grams of TMEDA were placed. These ingredients were mixed in an inert atmosphere and the vessel was closed and heated at 70° C. for 48 hours. At the end of this time the metalated product was cooled to −20° C. and hydrolyzed with deuterium oxide. Using standard work-up procedures, 67 percent of the naphthalene was recovered which contained more than 1 deuterium per naphthalene nucleus as determined by mass spectroscopy. See Table I in which m/e (the mass numbers) indicates the molecular weight of the various deuterated naphthalenes which are present in the reaction products.

TABLE I.—MASS SPECTRUM OF DEUTERATED NAPHTHALENE AND FORMULAE OF LITHIATED NAPHTHALENES

| m/e | Relative abundance | Ions | Lithiated naphthalene |
|---|---|---|---|
| 128 | 2.2 | $C_{10}H_8$ | |
| 129 | 33.0 | $C_{10}H_7D$ | $C_{10}H_7Li$ |
| 130 | 40.0 | $C_{10}H_6D_2$ | $C_{10}H_6Li_2$ |
| 131 | 100.0 | $C_{10}H_5D_3$ | $C_{10}H_5Li_3$ |
| 132 | 100.0 | $C_{10}H_4D_4$ | $C_{10}H_4Li_4$ |
| 133 | 33.0 | $C_{10}H_3D_5$ | $C_{10}H_3Li_5$ |

Table I shows that one to five deuteriums were incorporated on the naphthalene, which indicates that five lithium atoms had been added to the naphthalene. If a large excess of butyllithium is used in the reaction it is possible to add six, seven and eight lithium atoms to the naphthalene.

The above described procedure was followed in the metalation of indene, biphenyl, anthracene fluorene and benzene. This is described in greater detail below. The reaction mixtures were hydrolyzed by deuterium oxide and the results of the hydrolysis product examined by mass spectroscopy. See Tables II, III, IV, V, and VI.

TABLE II.—MASS SPECTRUM OF DEUTERATED INDENES AND FORMULAE OF LITHIATED INDENES

| m/e | Relative abundance | Ions | Lithiated indenes |
|---|---|---|---|
| 116 | 32.65 | $C_9H_8$ | |
| 117 | 55.10 | $C_9H_7D$ | $C_9H_7Li$ |
| 118 | 65.306 | $C_9H_6D_2$ | $C_9H_6Li_2$ |
| 119 | 100 | $C_9H_5D_3$ | $C_9H_5Li_3$ |
| 120 | 85.71 | $C_9H_4D_4$ | $C_9H_4Li_4$ |
| 121 | 38.77 | $C_9H_3D_5$ | $C_9H_3Li_5$ |
| 122 | 14.28 | $C_9H_2D_6$ | $C_9H_2Li_6$ |
| 123 | 10.20 | $C_9HD_7$ | $C_9HLi_7$ |

TABLE II-A.—MASS SPECTRUM OF ALKYLATED INDENES

| m/e | Relative abundance | Ions | Lithiated indenes |
|---|---|---|---|
| 175 | 20.0 | $C_9H_4D_3C_4H_9$ | $C_9H_4Li_3C_4H_9$ |
| 176 | 100.0 | $C_9H_3D_4C_4H_9$ | $C_9H_3Li_4C_4H_9$ |
| 177 | 30.0 | $C_9H_2D_5C_4H_9$ | $C_9H_2Li_5C_4H_9$ |
| 228 | | $C_9H_6(C_4H_9)_2$ | $C_9H_6(C_4H_9)_2$ |
| 229 | | $C_9H_5D(C_4H_9)_2$ | $C_9H_5Li(C_4H_9)_2$ |

TABLE III.—MASS SPECTRUM OF DEUTERATED BIPHENYL AND FORMULAE OF LITHIATED BIPHENYLS

| m/e | Relative abundance | Ions | Lithiated biphenyls |
|---|---|---|---|
| 154 | 26.37 | $C_{12}H_{10}$ | |
| 155 | 43.95 | $C_{12}H_9D$ | $C_{12}H_9Li$ |
| 156 | 100.00 | $C_{12}H_8D_2$ | $C_{12}H_8Li_2$ |
| 157 | 57.14 | $C_{12}H_7D_3$ | $C_{12}H_7Li_3$ |
| 158 | 20.87 | $C_{12}H_6D_4$ | $C_{12}H_6Li_4$ |
| 159 | 4.39 | $C_{12}H_5D_5$ | $C_{12}H_5Li_5$ |

TABLE IV.—MASS SPECTRUM OF DEUTERATED ANTHRACENE AND FORMULAE OF LITHIATED ANTHRACENES

| m/e | Relative abundance | Ions | Lithiated anthracenes |
|---|---|---|---|
| 179 | 12.5 | $C_{14}H_9D$ | $C_{14}H_9Li$ |
| 180 | 34.72 | $C_{14}H_8D_2$ | $C_{14}H_8Li_2$ |
| 181 | 69.44 | $C_{14}H_7D_3$ | $C_{14}H_7Li_3$ |
| 182 | 100.00 | $C_{14}H_6D_4$ | $C_{14}H_6Li_4$ |
| 183 | 66.66 | $C_{14}H_5D_5$ | $C_{14}H_5Li_5$ |
| 184 | 48.61 | $C_{14}H_4D_6$ | $C_{14}H_4Li_6$ |
| 185 | 22.22 | $C_{14}H_3D_7$ | $C_{14}H_3Li_7$ |
| 186 | 6.94 | $C_{14}H_2D_8$ | $C_{14}H_2Li_8$ |
| 187 | 0.69 | $C_{14}HD_9$ | $C_{14}HLi_9$ |

TABLE V.—MASS SPECTRUM OF DEUTERATED FLUORENE AND FORMULAE OF LITHIATED FLUORENES

| m/e | Relative abundance | Ions | Lithiated fluorenes |
|---|---|---|---|
| 166 | 0.67 | $C_{13}H_{10}$ | |
| 167 | 3.33 | $C_{13}H_9D_1$ | $C_{13}H_9Li$ |
| 168 | 2.66 | $C_{13}H_8D_2$ | $C_{13}H_8Li_2$ |
| 169 | 76.66 | $C_{13}H_7D_3$ | $C_{13}H_7Li_3$ |
| 170 | 100.00 | $C_{13}H_6D_4$ | $C_{13}H_6Li_4$ |
| 171 | 73.33 | $C_{13}H_5D_5$ | $C_{13}H_5Li_5$ |
| 172 | 55.33 | $C_{13}H_4D_6$ | $C_{13}H_4Li_6$ |
| 173 | 10.66 | $C_{13}H_3D_7$ | $C_{13}H_3Li_7$ |
| 174 | 2.66 | $C_{13}H_2D_8$ | $C_{13}H_2Li_8$ |
| 175 | 1.33 | $C_{13}HD_9$ | $C_{13}HLi_9$ |
| 176 | 0.67 | $C_{13}D_{10}$ | $C_{13}Li_{10}$ |

The mass spectrum of deuterated indene with mass numbers of 117 to 123 corresponds to 1 to 7 deuteriums incorporated in the indene which indicates that 1 to 7 lithiums were incorporated in the indene. Similarly, mass numbers of 155 to 159 were obtained from the mass spectroscopy of deuterium biphenyl. These correspond to 1 to 5 deuterium in biphenyl which indicates the incorporation of 1 to 5 lithium biphenyl. In another experiment, six deuteriums were added.

In mass spectroscopy of deuterium anthracene the presence of mass numbers of 179 to 187 were obtained which correspond to 1 to 9 deuteriums incorporated in the anthracene, which in turn indicates that 1 to 9 lithiums were incorporated in the anthracene. In another run a trace of $C_{14}D_{10}$ with m/e 188 was obtained.

A mass number of 167 to 176 is obtained from the mass spectrum of deuterated fluorene which corresponds to 1 to 10 deuteriums incorporated in fluorene which, in turn, indicates that 1 to 10 lithiums were incorporated on the fluorene.

These results were verified when the reaction mixtures of separate runs were allowed to react with chlorotrimethylsilane which produced derivatives of the products that had been metalated.

TABLE VI.—MASS SPECTRUM OF DEUTERATED BENZENE AND FORMULAE OF LITHIATED BENZENES

| m/e | Relative abundance | Ions | Lithiated benzenes |
|---|---|---|---|
| 79 | 70 | $C_6H_5D$ | $C_6H_5Li$ |
| 80 | 100 | $C_6H_4D_2$ | $C_6H_4Li_2$ |
| 81 | 50 | $C_6H_3D_3$ | $C_6H_3Li_3$ |
| 82 | 35 | $C_6H_2D_4$ | $C_6H_2Li_4$ |
| 83 | 35 | $C_6H_1D_5$ | $C_6H_1Li_5$ |
| 84 | 20 | $C_6D_6$ | $C_6Li_6$ |

TABLE VII.—MASS SPECTRUM OF SILATED BENZENE

| m/e | Relative abundance | Ions |
|---|---|---|
| 150 | 50.4 | $C_6H_5SiMe_3$ |
| 222 | 100. | $C_6H_4(SiMe_3)_2$ |
| 294 | 32.5 | $C_6H_3(SiMe_3)_3$ |
| 366 | 7.5 | $C_6H_2(SiMe_3)_4$ |

TABLE VIII.—MASS SPECTRUM OF SILATED NAPHTHALENE

| m/e | Relative abundance | Ions |
|---|---|---|
| 200 | 5.00 | $C_{10}H_7SiMe_3$ |
| 272 | 26.20 | $C_{10}H_6(SiMe_3)_2$ |
| 344 | 5.00 | $C_{10}H_5(SiMe_3)_3$ |
| 416 | 5.00 | $C_{10}H_4(SiMe_3)_4$ |

TABLE IX.—MASS SPECTRUM OF SILATED INDENE

| m/e | Relative abundance | Ions |
|---|---|---|
| 188 | 26.30 | $C_9H_7SiMe_3$ |
| 260 | 11.10 | $C_9H_6(SiMe_3)_2$ |
| 332 | 100.0 | $C_9H_5(SiMe_3)_3$ |
| 404 | 20.0 | $C_9H_4(SiMe_3)_4$ |
| 476 | 3.0 | $C_9H_3(SiMe_3)_5$ |

TABLE X.—MASS SPECTRUM OF SILATED BIPHENYL

| m/e | Relative abundance | Ions |
|---|---|---|
| 226 | 100.0 | $C_{12}H_9SiM_3$ |
| 298 | 100.0 | $C_{12}H_8(SiMe_3)_2$ |
| 370 | 30.0 | $C_{12}H_7(SiMe_3)_3$ |
| 442 | 10.0 | $C_{12}H_6(SiMe_3)_4$ |

TABLE XI.—MASS SPECTRUM OF SILATED ANTHRACENE

| m/e | Relative abundance | Ions |
|---|---|---|
| 250 | 60.0 | $C_{14}H_9(SiMe_3)$ |
| 322 | 80.0 | $C_{14}H_8(SiMe_3)_2$ |
| 394 | 100.0 | $C_{14}H_7(SiMe_3)_3$ |
| 466 | 60.0 | $C_{14}H_6(SiMe_3)_4$ |
| 538 | 50.0 | $C_{14}H_5(SiMe_3)_5$ |
| 610 | 20.0 | $C_{14}H_4(SiMe_3)_6$ |
| 682 | 20.0 | $C_{14}H_3(SiMe_3)_7$ |
| 754 | 10.0 | $C_{14}H_2(SiMe_3)_8$ |
| 826 | 10.0 | $C_{14}H(SiMe_3)_9$ |
| 898 | 20.0 | $C_{14}(SiMe_3)_{10}$ |

TABLE XII.—MASS SPECTRUM OF SILATED FLUORENE

| m/e | Relative abundance | Ions |
|---|---|---|
| 310 | 75.01 | $C_{13}H_8(Me_3Si)_2$ |
| 382 | 100.00 | $C_{13}H_7(Me_3Si)_3$ |
| 454 | 87.50 | $C_{13}H_6(Me_3Si)_4$ |
| 526 | 31.25 | $C_{13}H_5(Me_3Si)_5$ |
| 598 | 12.50 | $C_{13}H_4(Me_3Si)_6$ |
| 670 | 6.25 | $C_{13}H_3(Me_3Si)_7$ |

DISCUSSION

Anthracene was metalated with n-butyllithium and TMEDA at 70° C. for 12–48 hours. A brown precipitate formed. This precipitate was quenched with $D_2O$ and the product was analyzed by mass spectrometry. The mass spectrum analysis showed the appearance of mass numbers of 179 to 188. This corresponds to anthracene containing mass number distribution from one deuterium to 10 deuteriums, which indicates that some of the anthracene has been partially and some fully lithiated. During the reaction with n-butyllithium and TMEDA, the anthracene underwent a substitution reaction in which a butyl group became attached to the ring in a 1,4-addition process. The results of reaction with deuterium oxide are given in Table XIII.

TABLE XIII.—MASS SPECTRA OF ALKYLATED ANTHRACENE AND FORMULAE OF LITHIATED COMPOUNDS

| m/e | Relative abundance | Ions | Lithiated compounds |
|---|---|---|---|
| 237 | 39.5 | $C_{14}H_8D(C_4H_9)$ | $C_{14}H_8(C_4H_9)Li$ |
| 238 | 17.40 | $C_{14}H_7D_2(C_4H_9)$ | $C_{14}H_7(C_4H_9)Li_2$ |
| 239 | 100.0 | $C_{14}H_6D_3(C_4H_9)$ | $C_{14}H_6(C_4H_9)Li_3$ |
| 240 | 9.5 | $C_{14}H_5D_4(C_4H_9)$ | $C_{14}H_5(C_4H_9)Li_4$ |
| 241 | 10.0 | $C_{14}H_4D_5(C_4H_9)$ | $C_{14}H_4(C_4H_9)Li_5$ |
| 241 | 17.20 | $C_{14}H_3D_6(C_4H_9)$ | $C_{14}H_3(C_4H_9)Li_6$ |
| 291 | 20.0 | $C_{14}H_7D(C_4H_9)_2$ | $C_{14}H_7(C_4H_9)_2Li$ |
| 292 | 100.0 | $C_{14}H_6D_2(C_4H_9)_2$ | $C_{14}H_6(C_4H_9)_2Li_2$ |
| 293 | 49.0 | $C_{14}H_5D_3(C_4H_9)_2$ | $C_{14}H_5(C_4H_9)_2Li_3$ |
| 294 | 45.0 | $C_{14}H_4D_4(C_4H_9)_2$ | $C_{14}H_4(C_4H_9)_2Li_4$ |
| 295 | 43.0 | $C_{14}H_3D_5(C_4H_9)_2$ | $C_{14}H_3(C_4H_9)_2Li_5$ |
| 296 | 20.0 | $C_{14}H_2D_6(C_4H_9)_2$ | $C_{14}H_2(C_4H_9)_2Li_6$ |
| 297 | 4.0 | $C_{14}HD_7(C_4H_9)_2$ | $C_{14}H(C_4H_9)_2Li_7$ |
| 349 | 20.0 | $C_{14}H_6D(C_4H_9)_3$ | $C_{14}H_6(C_4H_9)_3Li$ |
| 350 | 10.0 | $C_{14}H_5D_2(C_4H_9)_3$ | $C_{14}H_5(C_4H_9)_3Li_2$ |
| 351 | 100.0 | $C_{14}H_4D_3(C_4H_9)_3$ | $C_{14}H_4(C_4H_9)_3Li_3$ |
| 352 | 35.0 | $C_{14}H_3D_4(C_4H_9)_3$ | $C_{14}H_3(C_4H_9)_3Li_4$ |
| 353 | 22.0 | $C_{14}H_2D_5(C_4H_9)_3$ | $C_{14}H_2(C_4H_9)_3Li_5$ |
| 354 | 11.0 | $C_{14}HD_6(C_4H_9)_3$ | $C_{14}H(C_4H_9)_3Li_6$ |
| 355 | 6.0 | $C_{14}D_7(C_4H_9)_3$ | $C_{14}(C_4H_9)_3Li_7$ |

Other metalated anthracene was reacted with excess chlorotrimethylsilane. A dark brown oil was isolated. This oil was examined by the mass spectrometer. The results of the mass spectrum are tabulated in Table XI. The results showed the appearance of m/e values 250 up to 898. These values substantiate the results obtained by deuteration experiments. Some of the anthracene became fully lithiated to $C_{14}Li_{10}$ which gave $C_{14}D_{10}$ on hydrolysis with deuterium oxide and $C_{14}(Me_3Si)_{10}$ on silation. It is clear from the mass spectra of the deuterated as well as the silated anthracene that complete lithiation of the anthracene nucleus with TMEDA and butyllithium was realized.

The reaction of n-butyllithium and TMEDA with anthracene gave rise to 9,10-dihydro-derivatives which also underwent metalation. This was shown by mass spectrometer examination of the deuterated as well as the silated material. Table XIII shows the appearance of m/e mass numbers at 237 to 241, 291 to 297 and 349 to 355 corresponding to mono-, di- and tributyl anthracene, while Table XIV shows the mass number peaks at 308 to 884, corresponding to mono-butyl anthracene and 363 to 509 in Table XV corresponding to di-butyl anthracenes that have been silated with several silyl groups. It was difficult to detect silated tributyl anthracene in the mass spectrometer probably because of its low volatility.

TABLE XIV.—MASS SPECTRA OF MONO-ALKYLATED AND SILATED ANTHRACENE

| m/e | Relative abundance | Ions |
|---|---|---|
| 308 | 100.0 | $C_{14}H_8(C_4H_9)(SiMe_3)$ |
| 380 | 23.4 | $C_{14}H_7(C_4H_9)(SiMe_3)_2$ |
| 452 | 38.3 | $C_{14}H_6(C_4H_9)(SiMe_3)_3$ |
| 524 | 10.6 | $C_{13}H_5(C_4H_9)(SiMe_3)_4$ |
| 596 | 2.3 | $C_{14}H_4(C_4H_9)(SiMe_3)_5$ |
| 668 | 2.3 | $C_{14}H_3(C_4H_9)(SiMe_3)_6$ |
| 740 | [1] 1.2 | $(C_{14}H_2(C_4H_9)(SiMe_3)_7$ |
| 812 | | $C_{14}H_1(C_4H_9)(SiMe_3)_8$ |
| 884 | | $C_{14}(C_4H_9)(SiMe_3)_9$ |

[1] Trace.

TABLE XV.—MASS SPECTRA OF DI-ALKYLATED SILATED ANTHRACENE

| m/e | Relative abundance | Ions |
|---|---|---|
| 363(1) | | $C_{14}H_7(C_4H_9)_2SiMe_3$ |
| 364(1) | 32.5 | $C_{14}H_7(C_4H_9)_2SiMe_3$ |
| 365(2) | | $C_{14}H_7(C_4H_9)_2SiMe_3$ |
| 435(2) | | $C_{14}H_6(C_4H_9)_2(SiMe_3)_2$ |
| 436(1) | 100.00 | $C_{14}H_6(C_4H_9)_2(SiMe_3)_2$ |
| 437(3) | | $C_{14}H_6(C_4H_9)_2(SiMe_3)_2$ |
| 507 | | $C_{14}H_5(C_4H_9)_2(SiMe_3)_3$ |
| 508 | 9.00 | $C_{14}H_5(C_4H_9)_2(SiMe_3)_3$ |
| 505 | | $C_{14}H_5(C_4H_9)_2(SiMe_3)_3$ |

The same metalation reaction was applied to fluorene with results similar to those obtained with anthracene. The product analysis after treatment with $D_2O$ is listed in Table V. These results strongly suggest that fluorene has been metalated to the extent of placing ten lithiums on the fluorene nucleus. The yield obtained based on mass spectral data shows that $C_{13}H_6D_4$ is the predominant species. The above results were confirmed by silation. The derivatives obtained upon reaction of chlorotrimethyl silane with lithiated fluorene are found in Table XII. The low volatility of the higher silated products may have prevented detection.

Similar results to those found with anthracene were also observed in the metalation of fluorene. It was found that an alkylation reaction had taken place on the fluorene nucleus. Mono-, di- and tri- as well as tetra alkyl fluorene were detected by mass spectrometer, Table XVI.

TABLE XVI.—MASS SPECTRUM OF ALKYLATED FLUORENE

| m/e | Relative abundance | Ions |
|---|---|---|
| 170 | 50 | $C_{13}H_6D_4$ |
| 226 | 100 | $C_{13}H_5D_4(C_4H_9)$ |
| 282 | 11.50 | $C_{13}H_4D_4(C_4H_9)_2$ |
| 337 | 5.50 | $C_{13}H_3D_4(C_4H_9)_3$ |
| 393 | 5.50 | $C_{13}H_2D_4(C_4H_9)_4$ |

The metalation of biphenyl yielded a reaction product brown in color which upon hylrolysis with heavy water yielded after sublimation a white solid containing several deuterium atoms on the ring. The appearance of mass numbers at 155 to 159 (Table III) indicated the presence of one to six deuterium atoms on the biphenyl which is indicative of the presence of one to six lithiums on the biphenyl. In a separate experiment the metalated biphenyl was silated with chlorotrimethyl silane yielding a brown oil. This oil was examined by mass spectrometer which is included in Table X. This shows the appearance of mass numbers corresponding to 226 (SiMe₃), 298 (SiMe₃)₂, 370 (SiMe₃)₃, 442 (SiMe₃)₄ on the biphenyl.

The biphenyl was found to undergo alkylation reactions. The mass spectrum showed the presence at 212 and 268 of mono- and dibutyl groups on the biphenyl. These results clearly indicate that biphenyl undergoes metalation as well as butylation reactions with n-butyllihium TMEDA, when the reaction product is hydrolyzed with heavy water. See Table XVII.

TABLE XVII.—MASS SPECTRUM OF ALKYLATED BIPHENYL

| m/e | Relative abundance | Ions | Lithiated compounds |
|---|---|---|---|
| 212 | 100.0 | $C_{12}H_7D_2C_4H_9$ | $C_{12}H_7Li_2C_4H_9$ |
| 213 | 20.0 | $C_{12}H_6D_3C_4H_9$ | $C_{12}H_6Li_3C_4H_9$ |
| 214 | 10.0 | $C_{12}H_5D_4C_4H_9$ | $C_{12}H_5Li_4C_4H_9$ |
| 268 | 30.0 | $C_{12}H_6D_2(C_4H_9)_2$ | $C_{12}H_6Li_2(C_4H_9)_2$ |
| 269 | 5.0 | $C_{12}H_5D_3(C_4H_9)_2$ | $C_{12}H_5Li_3(C_4H_9)_2$ |
| 270 | 2.0 | $C_{12}H_4D_4(C_4H_9)_2$ | $C_{12}H_4Li_4(C_4H_9)_2$ |

Indene was metalated in hydrocarbon solvent at 70° C. using TMEDA BuLi, the n-butyllithium complex, as the metalating agent. The product of the metalation was allowed to react with heavy water. The product isolated by distillation was examined by the mass spectrometer. The mass spectrum revealed the presence of several deuteriums on the indene, Table II. The appearance of mass numbers of 117 to 123 clearly indicates that the indene underwent metalation reaction to the extent of seven lithium atoms on the nucleus. These results were further confirmed by the appearance of the mass numbers in the mass spectrum (Table IX) of 188 (SiMe₃), 260 (SiMe₃)₂, 332 (SiMe₃)₃, 404 (SiMe₃)₄, 476 (SiMe₃)₅ on the indene. Moreover, indene underwent alkylation to give monobutyl and dibutyl indenes. See Table II–A.

Instead of using n-butyllithium and TMEDA for metalation of anthracene, anthracene may be metalated with t-butyllithium and potassium-t-butoxide at 70° C. for 12 to 48 hours. The product can be quenched with $D_2O$ and the deuterated product can be recovered, and on analysis will give mass numbers of 179 to 188, which indicate that the anthracene has been metalated to the extent of 10 metal atoms.

Fluorene, benzene, naphthalene, indene and biphenyl can be metalated under the same conditions and the products analyzed by mass spectroscopy after quenching with $D_2O$, and the analyses of the deuterated product will show multi-metalation on the aromatic nucleus as above disclosed.

The mono- and di-lithium compounds previously prepared by other procedures and discussed in Gilman et al. are useful as polymerization catalysts. However, the polymers prepared using such catalysts have normal molecular-weight distribution and are mono-dispersed. Using the lithiated hydrocarbons of this invention which contain more than two lithium atoms, as polymerization initiators, polymers are obtained which have a broad mol weight distribution similar to that of natural rubber with multi-functional ends. For example, tying four or five chains together a polymer is produced in which there is a live lithium on each chain end, from which derivatives having a multiple of functional terminal groups may be produced.

Furthermore, the elastomer or rubber produced by such initiators can be used as an intermediate for thermoset plastics since it has peroxide-curable vinyl sites.

One or more lithiums of the lithiated products may be replaced by carboxyl, hydroxyl, amino, halogen, formyl, acetyl, benzoyl, methyl, benzyl, benzhydryl, allyl, hydroxymethyl, beta-hydroxyethyl or substituted silyl groups, etc. (see Gilman and Morton, supra), and by inorganic compounds, for instance, triphenyltin chloride, germanium tetrabromide, antimony trichloride, triphenyl-lead chloride, etc. (see Gilman and Morton supra) to produce known and new organometallic compounds. The new carboxylic acids can replace the known carboxylic acids for reaction with amines, for example, in the production of new nylon-type amides, including hard, non-linear plastics. The new hydroxy compounds can replace the known phenols in the production of new phenol-aldehydes for use as plastics, etc. The new amino derivatives can replace known amines in the production of antioxidants and other stabilizing agents for organic products.

I claim:

1. The process of multi-lithiating a hydrocarbon benzenoid which comprises reacting the benzenoid in an inert solvent with alkyllithium in the presence of an effective amount of a promoter of the class consisting of (a) N,N,N',N'-tetralkyl ethylenediamine where each alkyl group is a straight- or branched-chain alkyl group of 1 to 10 carbon atoms and (b) potassium alkoxides in which the alkyl group contains substantially 1 to 4 carbon atoms, to speed up the reaction and producing a multi-lithiated benzenoid, said alkyllithium containing 1 to 20 carbon atoms.

2. The process of claim 1 in which the benzenoid is benzene.

3. The process of claim 1 in which biphenyl is lithiated.

4. The process of claim 1 in which the promoter is N,N,N',N'-tetra-methylethylenediamine.

5. The process of multi-lithiating benzene which comprises reacting benzene with n-butyllithium and tetramethylethylene diamine until lithium has replaced at least three of the hydrogens from a substantial amount of the benzene.

6. The process of metalating anthracene which comprises reacting anthracene with t-butyllithium and potassium-t-butoxide until at least one hydrogen has been replaced by lithium.

7. The process of claim 1 in which the promoter is potassium alkoxide in which the alkyl group contains 1 to 4 carbon atoms.

8. The process of claim 7 in which the promoter is potassium butoxide.

9. Benzene metalated with at least three lithium atoms.

10. Naphthalene lithiated with at least four lithium atoms.

11. Anthracene lithiated with a plurality of lithium atoms.

12. Biphenyl lithiated with at least three lithium atoms.

13. Fluorene lithiated with a plurality of lithium atoms.

14. Indene lithiated with a plurality of lithium atoms.

References Cited

Benkeser et al., Chem. Rev. 57 (1957) pp. 870–1 875–6.

Screttas et al., J. Am. Chem. Soc. 87 (1965) pp. 3276–7.

Rausch et al., J. Argmet. Chem. 10 (1967) pp. 127–136 (Published 10/9/67).

Gilman et al., J. Am. Chem. Soc., 61 (1939) pp. 109–112.

Dwyer et al., Chelating Agents and Metal Chelates, Academic Press, New York, N.Y., (1964) pp. 17–18.

Letsinger et al., Chem. Abstracts 57 (1962) col. 2153.

Talalaeva et al., Chem. Abstracts 45 (1951) col. 10191–2.

Gelius, Chem. Abstracts 54 (1960) col. 21043.

Wittig, Chem. Abstracts 51 (1957) col. 13840.

TOBIAS E. LEVOW, Primary Examiner

A. P. DEMERS, Assistant Examiner

U.S. Cl. X.R.

252—431; 260—429, 429.7, 437, 446, 448.2, 515, 568, 590, 599, 649

PO-1050
(5/69)

UNITED STATES PATENT OFFICE
CERTIFICATE OF CORRECTION

Patent No. 3,632,658  Dated January 4, 1972

Inventor(s) ADEL F. HALASA

It is certified that error appears in the above-identified patent and that said Letters Patent are hereby corrected as shown below:

Col. 1, line 49, "Malasa" should read --Halasa-- line 54 should read --was obtained. Application Ser. No. 606,011 of Halasa and Tate filed Dec. -- line 58 should read --It has now been found that if a promoter is present--

Col. 6, Table X, first line of last column,
"$C_{12}H_9SieM_3$" should read --$C_{12}H_9SiMe_3$--

Col. 6, line 35, "pectrum" should read --spectrum--

Col. 7, line 37, "505" should read --509--

Col. 8, line 7, "n-butyllihium" should read --butyllithium--

Signed and sealed this 11th day of July 1972.

(SEAL)
Attest:

EDWARD M. FLETCHER, JR.
Attesting Officer

ROBERT GOTTSCHALK
Commissioner of Patents